United States Patent [19]

Tanielian et al.

[11] Patent Number: 5,473,466
[45] Date of Patent: Dec. 5, 1995

[54] MAGNETO-OPTICAL DISPLAY AND METHOD OF FORMING SUCH DISPLAY

[76] Inventors: Aram A. Tanielian; Garo W. Tanielian, both of 7013 Cherty Dr., Rancho Palos Verdes, Calif. 90274

[21] Appl. No.: 252,675

[22] Filed: Jun. 2, 1994

[51] Int. Cl.$^6$ .................................................. G02F 1/09
[52] U.S. Cl. ........................... 359/282; 365/2; 365/122; 428/209
[58] Field of Search ................................ 359/280, 281, 359/282, 283, 324; 365/2, 23, 122; 428/209

[56] References Cited

U.S. PATENT DOCUMENTS

| | | | |
|---|---|---|---|
| 3,831,156 | 8/1974 | Myer | 359/282 |
| 4,164,028 | 8/1979 | Voegeli | 365/2 |
| 4,497,545 | 2/1985 | Ross | 359/282 |
| 4,500,176 | 2/1985 | MacNeal | 359/282 |
| 4,500,177 | 2/1985 | MacNeal | 359/282 |
| 4,584,237 | 4/1986 | Pulliam | 359/282 |
| 5,389,428 | 2/1995 | Fleming et al. | 428/209 |

*Primary Examiner*—Loha Ben
*Attorney, Agent, or Firm*—Ellsworth R. Roston; Charles H. Schwartz

[57] ABSTRACT

A thin transparent epitaxial layer of a magnetizable material (e.g. gallium ferrite) is deposited on a substrate of a dielectric transparent material (e.g. gadolinium gallium garnet). A mask made from an oxidizable material (e.g. silicon) deposited on the epitaxial layer covers pixels defining rows and columns and exposes the other areas on the epitaxial layer. The epitaxial layer is then annealed at a suitable temperature (e.g. 500° C.) for a suitable time (e.g. 10 minutes) to oxidize the silicon and reduce the Fe atoms in the pixel areas beneath the mask to $Fe^{++}$ ions. This causes the pixel areas beneath the mask to be more easily magnetizable than the other areas in the epitaxial layer. The mask is then removed and a first insulating layer is deposited on the epitaxial layer. A first plurality of windings is then deposited on the first insulated layer in insulating relationship to one another. Each winding extends in a sinuous path in three (3) directions, two (2) oppositely disposed, magnetically coupled to each pixel in an individual one of the columns. A second insulating layer is then deposited on the first windings. A second plurality of windings is then deposited on the second insulating layer in the same relationship to the pixels in the rows as the relationship of the first windings to the pixels in the columns. A pixel common to an individual winding in the first plurality and to an individual winding in the second plurality is then magnetized in accordance with the current magnitudes in the two (2) windings.

40 Claims, 2 Drawing Sheets

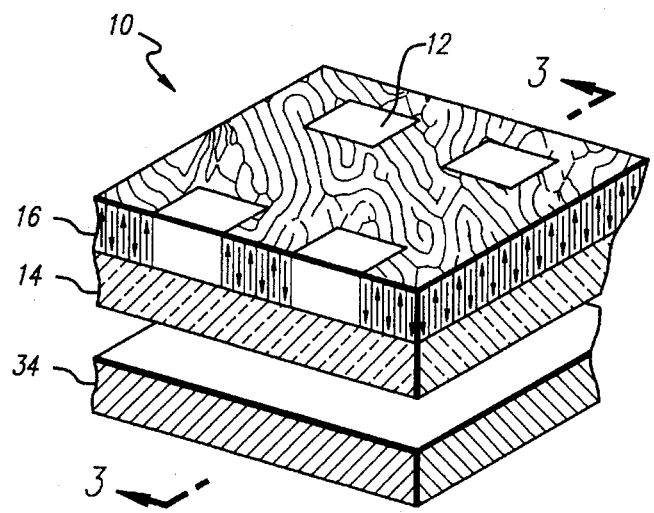
FIG. 1
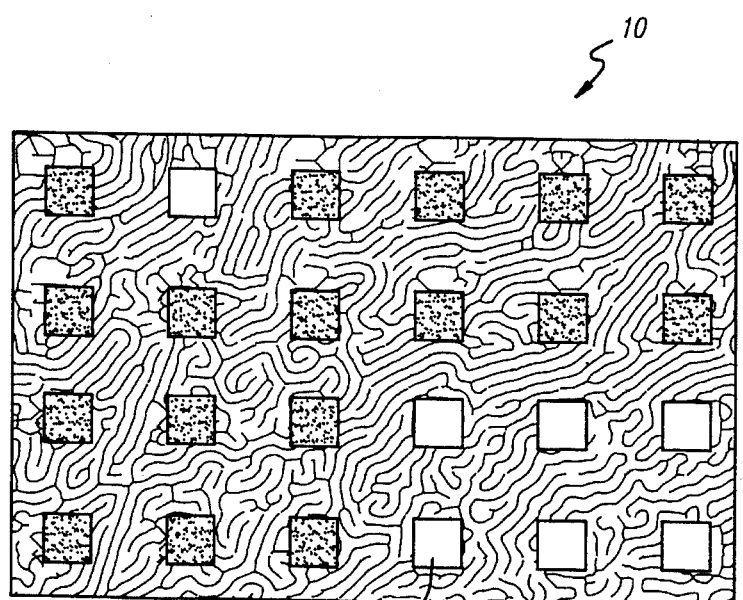
FIG. 2
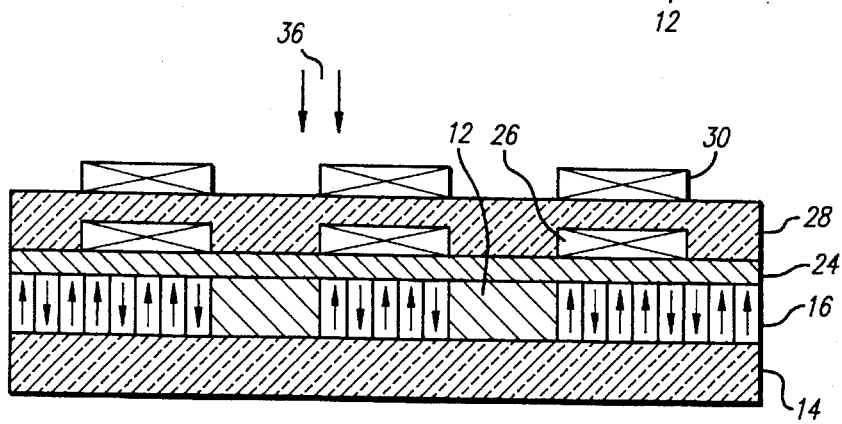
FIG. 3

MAGNETO-OPTICAL DISPLAY AND METHOD OF FORMING SUCH DISPLAY

BACKGROUND OF THE INVENTION

1. Field of the Invention

This invention relates to a method of forming a magneto-optical device and for producing in such device magnetizations of opposite polarities and for producing illuminations in accordance with the polarities of such magnetizations. The invention also relates to a method of producing such a magneto-optical device in which a plurality of pixels are provided for producing an image in accordance with the pattern of illuminations provided in the pixels.

2. Description of Related Art

Devices are known in the prior art for defining a plurality of pixels on a thin magnetizable layer of a thin transparent dielectric substrate. The magnetizable layer is formed from a material capable of being saturated with magnetic fluxes of opposite polarities. When the magnetizable layer is saturated with magnetism of one polarity, the magnetizable material becomes polarized in one direction. The magnetizable layer becomes polarized in an opposite direction when it is saturated with magnetism of an opposite polarity. When light is directed to the magnetizable layer, the light passes through the epitaxial layer when the layer is polarized in one direction. The passage of light through the epitaxial layer is blocked when the magnetizable layer is polarized in the opposite direction. In this way, a visual image can be provided in the device.

The devices described in the previous paragraph have been disclosed and claimed in a number of patents including the following assigned of record to Litton Industries, Inc., of Beverly Hills, Calif. U.S. Pat. Nos.:

4,478,872
4,497,545
4,500,176
4,500,177
4,563,236
4,578,321

The devices described above divide the magnetizable layer into a plurality of pixels by providing electrical lines on the magnetizable layer in a matrix relationship. Each pixel may have a length of only a relatively few microns such as in the order of approximately twenty microns (20μ) to approximately two hundred and fifty microns (250μ) and may have a corresponding or different width. By providing the pixels with such a small area in the matrix arrangement and by saturably magnetizing the pixels on a selective basis with opposite polarities to illuminate the pixels on such a selective basis, a visual image can be produced in the matrix when a polarized light is introduced to the matrix.

The visual displays discussed in the previous paragraphs have certain important advantages. One advantage is that a large number of pixels can be disposed in a small area so that a compact image can be provided for a finite number of pixels. Alternatively, an image of high resolution can be provided by enlarging the image and increasing the number of pixels in the image. However, the visual display described above has certain significant disadvantages. One disadvantage is that the magnetic force required to provide the magnetizable layer with a saturable magnetization in the two opposite polarities is relatively large. Another disadvantage is that the intensity of the light transmitted through the pixels is relatively low because of high absorption coefficients in the pixels.

A further disadvantage results from the fact that the pixels are formed by raised portions and that the conductors for magnetizing the pixels are disposed in troughs between the raised portions. Since the corners of the pixels are sharp, discontinuities are produced in the conductors at the pixel corners. These discontinuities have often prevented the illuminating systems defined by the pixels from operating satisfactorily.

There is another significant disadvantage in the illuminating systems of the prior art. This has resulted from the fact that an isolated position, or isolated positions, in each pixel have had to be doped. The doping has had to be provided to facilitate the magnetization of the individual pixels by the passage of current through the conductors associated with such individual pixels.

In the illuminating systems of the prior art, a coil has had to envelope the pixel matrix. After the individual pixels have been magnetized, a current has been passed through the coil to saturate the magnetization of the pixels previously magnetized in one polarity. This insures that the polarized light will pass through these pixels. After the image in the pixel matrix has been illuminated, a current has had to be passed in one direction through the coil to produce the same magnetization in all of the pixels. This has prepared the pixel matrix to display another visual image.

The use of the enveloping coil is disadvantageous for several reasons. The coil requires the use of an additional component in the illuminating system. It increases the area occupied by the pixel matrix. The coil requires relatively large amounts of power since it operates on all of the pixels, particularly when the pixels are being magnetized in a unitary direction after an image has been produced. It also slows significantly the operation of the system in providing successive images.

The disadvantages discussed in the previous paragraphs have existed for some time. In spite of considerable efforts to overcome these disadvantages, the disadvantages have continued to exist. The illuminating systems now in use are slow, cumbersome and require considerable amounts of power to produce images which are of limited sharpness and clarity.

SUMMARY OF THE INVENTION

This invention provides an illuminating system which is fast and reliable, provides an image of clarity and improved resolution and consumes relatively low amounts of power. This invention also provides a method of significantly reducing the magnetic force required to magnetize the pixels in a magnetizable layer on a dielectric substrate and to significantly enhance the illumination provided by the pixels. The method of this invention is particularly adapted to be used with a gadolinium gallium garnet substrate on which a plurality of pixels is formed from a gallium ferrite composition.

In one embodiment of the invention, a thin transparent epitaxial layer of a magnetizable material (e.g. gallium ferrite) is deposited on a substrate of a dielectric transparent material (e.g. gadolinium gallium garnet). A mask made from an oxidizable material (e.g. silicon) deposited on the epitaxial layer covers pixels defining rows and columns and exposes the other areas on the epitaxial layer. The epitaxial layer is then annealed at a suitable temperature (e.g. 500° C.) for suitable time (e.g. 10 minutes) to oxidize the silicon and reduce the Fe atoms in the pixel areas beneath the mask to $Fe^{++}$ ions. This causes the pixel areas beneath the mask to be more easily magnetizable than the other areas in the epitaxial layer.

The mask is then removed and a first insulating layer is deposited on the epitaxial layer. A first plurality of windings is then deposited on the first insulating layer in insulating relationship to one another. Each winding extends in a sinuous path in three (3) directions, two (2) oppositely disposed, in magnetically coupled relationship to each pixel in an individual one of the columns. A second insulating layer is then deposited on the first windings. A second plurality of windings is then deposited on the second insulating layer in the same relationship to the pixels in the rows as the relationship of the first windings to the pixels in the columns. A pixel common to an individual winding in the first plurality and to an individual winding in the second plurality is then magnetized in accordance with the current magnitudes in the two (2) windings.

BRIEF DESCRIPTION OF THE DRAWINGS

FIG. 1 is a schematic perspective view of a magneto-optic display constituting one embodiment of the invention;

FIG. 2 is a schematic top plan view of the magneto-optical display shown in FIG. 1 and illustrates the operation of the display in providing a visual image;

FIG. 3 is a sectional view of the magneto-optical display and is taken substantially on the line 3—3 of FIG. 2;

DESCRIPTION OF THE PREFERRED EMBODIMENT(S)

Figure 4:
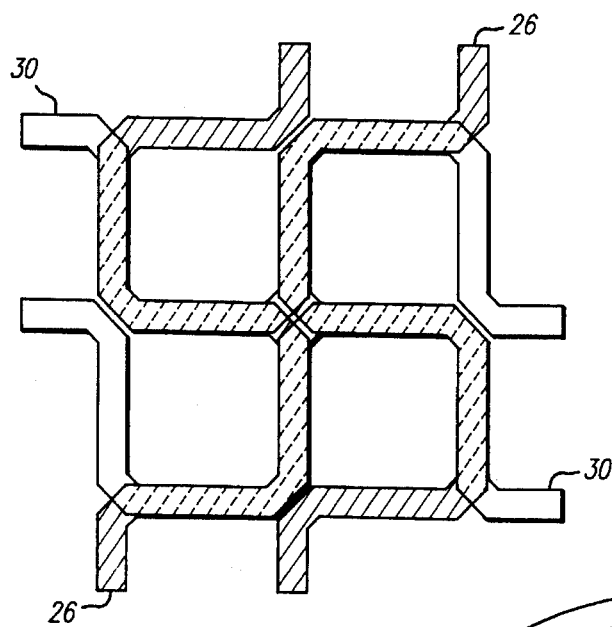
FIG. 4 is an enlarged fragmentary plan view of windings included in the embodiment shown in FIG. 3 to magnetize individual pixels shown in FIGS. 1–3.
Figure 5:
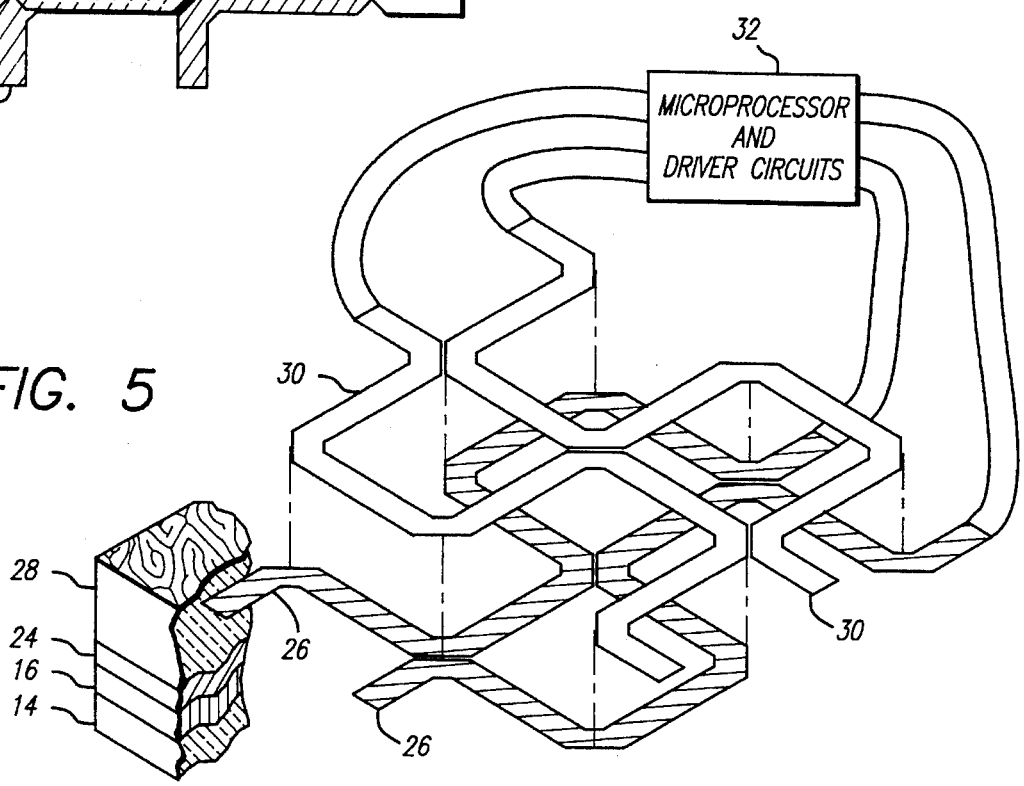
FIG. 5 is an enlarged fragmentary perspective view similar to that shown in FIG. 4 and illustrates the disposition of windings for columns of pixels relative to windings for rows of pixels.
Figure 6:
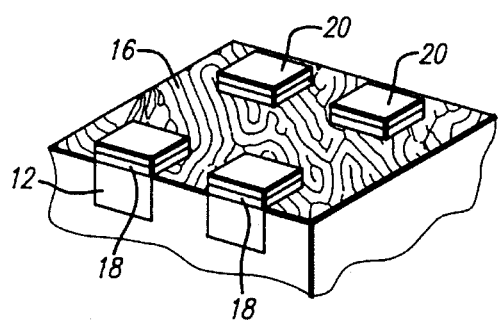
FIG. 6 is a perspective view of a mask which is used in operating on the pixels in a magnetizable layer to make the pixels more easily magnetizable than the areas between the pixels.

In one embodiment of the invention, a display member generally indicated at 10 is provided for displaying an image in a plurality of pixels 12. The display member 10 includes a substrate 14 formed from a transparent non-magnetic material having a high dielectric constant. For example, the substrate 14 may be formed from a gadolinium gallium garnet. The substrate 14 may have an orientation of <111> or <210>. The substrate may have a suitable thickness such as approximately 375–625 microns.

A thin transparent epitaxial layer 16 may be deposited on the substrate 14. The layer 16 preferably exhibits magnetic domain characteristics. The layer 16 may be fabricated by using a bismuth doped liquid phase epitaxial garnet in which a gallium ferrite is also included. However, other dopants may be used without departing from the scope of the invention. The inclusion of bismuth improves the properties of Faraday rotation in the garnet films. The material of the layer 16 may be deposited on the substrate 14 as by liquid phase epitaxy methods well known in the art.

Suitable materials for use as the thin film or layer 16 may be $(BiTm)_3(FeGa)_5O_{12}$ and $(BiLu)_3(FeGa_5)O_{12}$ films grown on GGG substrates with <111> orientations. Other suitable materials may be $(BiV)_3(FeGa)_5O_{12}$, $(BiYPrLu)_3(FeGa)_5O_{12}$ and $(BiGdTmPr)_3(FeGa)_5O_{12}$ film grown on the substrates of the combined substituted $(GdGa)_3(GaMgZr)_5O_{12}(CaGG)$ substrate with <111> or <210> orientations.

The epitaxial layer 16 may have a suitable thickness as in the range of approximately two microns $(2\mu)$ to approximately thirty microns $(30\mu)$. Preferably the thickness of the layer 16 is about six microns $(6\mu)$ to about fifteen microns $(15\mu)$.

A layer 18 of an oxizable material such as silicon may be deposited as by known methods on the epitaxial layer 16. The layer 18 may be deposited with a suitable thickness such as approximately five thousand Angstroms (5000 Å). The layer 18 may then be patterned with a mask 20 in a well known manner to define areas under the mask and other areas not under the mask. The mask 20 may be formed from a material which is impervious to etching. The silicon layer 18 may then be etched in a well known manner to remove the portions of the layer 18 not under the mask 20.

The portions of the layer 18 under the mask 20 may be considered to define the pixels 12 and the portions of the layer 18 not under the mask 20 may be considered to constitute areas between the pixels. After the layer 18 has been removed in the areas other than the areas of the pixels 12, the mask 20 is removed from the layer 18 so that the silicon layer 18 remains only in the areas defining the pixels 12.

The magneto-optical display 10 is then annealed at a particular temperature for a particular period of time. For example, the magneto-optical display 10 may be annealed at a suitable temperature such as approximately 500° C. for a suitable period of time such as approximately thirty minutes (10 min.). During the annealing process, the silicon in the layer 18 reduces oxygen from the surface of the substrate 14. The oxygen vacancies cause $Fe^{++}$ ions to be produced in the epitaxial layer 16. The pixels 12 then have a low anisotrophy. This in turn causes the epitaxial layer 16 at the positions of the pixels 12 to have properties which provide for an easier switching of magnetization of the layer 16 at the positions of the pixels 12 than at the areas between the pixels. For example, the pixels 12 may have a magnetization $4\pi M_s$ of about thirty (30) to fifty (50) gauss within the single domain information cell structure or light valve and about one hundred and fifty (150) to two hundred (200) gauss in the areas outside of the pixels where labyrinth domain structure takes place.

The enhancement in the magnetizable properties of the pixels 12 may occur in a manner such as described below. During the annealing, the silicon in the layer 18 removes oxygen from the surface of the substrate 14. This causes $Fe^{++}$ ions to be produced in the epitaxial layer 16. The presence of these oxygen vacancies or the $Fe^{++}$ ions causes local distortions to be produced in the lattice which reduces the relaxation time for transfers of gallium (Ga) ions between octahedral and tetrahedral sites. A redistribution of the gallium (Ga) ions occurs in the annealing step at much lower temperatures or shorter times, or both, than without the silicon layer 18 on the layer 16.

Thus, gallium (Ga) ions under the silicon mask 18 become transferred from octahedral to tetrahedral sites (the preferred sites for gallium much more rapidly than in the more perfect areas not under the pixels. This lowers the magnetization $4\pi M_s$ under the silicon in those garnet films in which the tetrahedral moment is larger than the combined octahedral and rare earth moments. These planar cell structures are now single magnetic bubble domains or pixels 12 each of which is easily switchable, independently of the other pixels, from one (1) magnetic polarity to the other without disturbing the neighboring cell structure or pixels.

After the magneto-optical display 10 has been annealed as described above, the layer 18 is removed from the epitaxial layer 16 as by techniques well known in the art. A layer 24 of a dielectric material is then deposited as by well known techniques on the layer 16. The layer 24 may be formed from a suitable dielectric material such as aluminum oxide ($Al_2O_3$), silicon dioxide ($SiO_2$) or calcium fluoride (CaF). The layer 24 may be deposited in a suitable thickness such as approximately two thousand Angstroms (2000 Å).

A layer may then be deposited on the dielectric layer 24 in a well known manner. The layer may be provided in a suitable thickness such as approximately one micron (1µ) to one and one half microns (1.5µ) and may be formed from a suitable conductive material such manganese bismuth (MnBi), titanium tungsten aluminum (TiW-Al) or titanium tungsten-gold (TiW-Au). The layer is then patterned with a photolithographic material and etched in a well known manner to form a first plurality of windings 26.

Each of the windings 26 may be magnetically associated with the pixels 22 in an individual one of the rows in the layer 16. Each of the windings 26 is patterned in a sinuous configuration to extend in more than one (1) direction relative to each pixel in the individual one of the rows. Preferably each winding extends in three (3) directions, two (2) oppositely disposed, and is magnetically coupled to each of the pixels in each of these directions. Each of the windings 26 may be considered to be partially wrapped around each of the pixels in the associated row. Each of the windings 26 is preferably provided in a sinuous path so that it is disposed only around the periphery of each pixel in the individual one of the rows and does not extend across such pixel.

A dielectric layer 28 is then deposited on and between the windings 26. The dielectric layer may be provided with a thickness of approximately one half of a micron (0.5µ) to about one micron (1µ) and may be formed from the same material as the dielectric layer 24. Windings 30 are then formed on the dielectric layer 28. The windings 30 may have the same pattern as the windings 26. However, the windings 30 are rotated by 90° relative to the windings 26 so as to have the same relationship to the columns of pixels as the windings 26 have to the rows of pixels. Thus, each of the windings 30 is magnetically coupled to the pixels 12 in an individual one of the columns. However, one (1) of the three (3) sides of the pixel enveloped by the individual one of the windings 30 may be considered to be different from any of the three (3) sides of such pixel enveloped by the individual one of the windings 26.

A microprocessor 32 is provided for producing at each instant a current through an individual one of the windings 26 and an individual one of the windings 30. For example, the current through each individual one of the windings 26 and 30 may be about one hundred milliamperes (100 ma.) or less. This is in contrast to currents of about one-half ampere (½a) in the windings of the magneto-optical displays of the prior art. The currents through the individual ones of the windings 26 and 30 produce magnetic fluxes in opposite directions in the pixel common to the individual ones of the windings. These fluxes may have intensities of about sixty (60) oersteds.

If the currents in the individual ones of the windings were equal, the magnetic fluxes produced in such common pixel would cancel. However, the current in one of the individual windings has a magnitude greater than the current in the other one of the windings. This causes a magnetic flux to be produced in the common pixel in accordance with the polarity of current through the winding with the greater magnitude. For example, the resultant magnetic flux in the pixel 12 common to the individual one of the windings 26 and the individual one of the windings 30 may be about twenty (20) or thirty (30) oersteds. This magnetic field is stable and there is no need to saturate the magnetic field thereafter as in the prior art.

As will be seen, the individual ones of the pixels 12 in the magneto-optical display 10 have at each instant an individual pattern of magnetic fluxes of first and second opposite polarities in accordance with the direction of current flows in the windings common to such pixels. These magnetic fluxes affect the pattern of the light passing through the pixels 12 and the dielectric layer 14. The light passing to the pixels 12 may be polarized as indicated at 36. For example, light of the first (1) polarity in one of the pixels 12 may pass through this pixel, the dielectric substrate 14 and a polarizer 34 when the pixel and the polarizer have the same polarization. However, light may not pass through another one of the pixels 12 when the pixel has the second polarity since the second polarity is opposite to the polarization of the polarizer 34. In this way, the magneto-optical display 10 may provide a unique image at each instant in accordance with a unique pattern of magnetization of the pixels 12 in the display with the first and second polarities.

It will be appreciated that the currents through the windings 26 and 30 may produce fluxes in the same directions, rather than in opposite directions, without departing from the scope of the invention. This can be accomplished by providing the currents with reduced intensities such that the pixel 12 to be energized will have a resultant magnetic flux of about twenty (20) to thirty (30) oersteds. This corresponds to the resultant flux specified above when the windings 26 and 30 produce fluxes of opposite polarities.

The magneto-optical display 10 described above and shown in the drawings has certain important advantages. It provides pixels which may be of any size or shape. For example, each pixel 12 may be as small as approximately two (2) microns (2µ) on each side in a rectangular or square configuration or as large as needed. Furthermore, the pixels 12 may have any desired configuration (e.g. rectangular, square, circular, triangular or hexagonal.) This allows the magneto-optical display 10 to have any desired pixel resolution such as 128×128 pixels, 256×256 pixels or 512×512 pixels or any desired rectangular configuration.

The pixels 12 in the magneto-optical display 10 may have a magnetization $4\pi M_s$ of about ten (10) gauss to about thirty (30) gauss. This results from the fact that the pixels 12 have a highly coercive orthoferrite structure. In contrast, the portions of the layer 16 between the pixels 12 may have a magnetization of about one hundred and fifty (150) gauss to about two hundred (200) gauss where Labyrinth domain structure takes place. This considerable difference between the magnetizable properties of the pixels 12 and the areas on the layer 16 outside of the pixels makes it relatively easy to magnetize the pixels and relatively difficult to magnetize the areas outside of the pixels. Furthermore, any magnetization of the pixels 12 is stable even without magnetically saturating the pixels.

The magneto-optical display 10 has other important advantages. It has no external wire-wound saturation coils as in the prior art. It also does not have an ion implanted region at the corner of each pixel 12 as in the prior art or at any other place in the pixel. There is also no nucleation by cross hair pin conductors as in the prior art. This simplifies considerably the construction of the magneto-optical display 10. It also significantly reduces the size of the magneto-optical display 10. It also increases the rate at which successive images can be provided in the magneto-optical display 10, and it considerably reduces the power to operate the magneto-optical display.

In the magneto-optical display 10 of this invention, the windings 26 are separated by the dielectric layer 24 from the layer 16 where the pixels 12 are located, and the windings 30 are separated by the dielectric layer 28 from the windings 26. Furthermore, the pixels 12, the windings 26 and the windings 30 are substantially parallel to one another. Because of this, there is no cross over of windings as in the prior art. Crossovers of windings are undesirable because they considerably complicate the construction of the magneto-optical display and further prevent the windings from having a planar construction. The lack of crossovers in the windings 26 and 30 and the planar constructions of these windings enhance the yields obtained from the fabrication of the magneto-optical display 10 and provides for a significant reduction in the cost of manufacturing the magneto-optical display.

Furthermore, the windings 26 and 30 do not press against any sharp corners in the pixels as in the prior art. Because of this, the windings cannot become frayed or broken as in the prior art. The frayings in the windings in the magneto optical displays of the prior art have resulted from the raised dispositions of the pixels in these displays and the disposition of the windings in troughs between the raised pixels. The spacing provided by the dielectric layer 24 between the pixels 22 and the windings 26 in the magneto-optical display of this invention also prevents the oxygen from being reduced from the epitaxial layer 16 with time aging as in the prior art.

Since the silicon layer 18 removes the oxygen from the epitaxial layer 16 and since the silicon layer 18 is thereafter removed, the layer 16 provides an enhanced throughput of light in comparison to the prior art. This provides an enhanced contrast between light and dark pixels. This enhanced contrast between light and dark pixels is facilitated because there are no windings crossing the pixels and there are no implanted areas at the corners of the pixels or at any other positions in the pixels.

The magneto-optical display 10 is also advantageous because the pixels are switched by pulse currents with low intensities. For example, each pixel can be switched from magnetization with one (1) polarity to magnetization with an opposite polarity by a current pulse of approximately one hundred milliamperes (100 ma) or less in the windings 26 and 30 common to such pixel. This is in contrast to current pulses with magnitudes of approximately one half (½) ampere in the prior art. The reduction in the magnitude of the current pulses is also advantageous in that it provides a considerable reduction in heat losses produced by the flow of current through the individual ones of the windings 26 and 30.

The simplified construction of the magneto-optical display 10 in comparison to the constructions of displays of the prior art also significantly increases the rate at which successive images can be provided by the display. This results from a number of factors including the elimination of the coil enveloping the display and the elimination of any implantations in the pixels and the etching of the pixels in the epitaxial layer. As will be appreciated, the rate of response of the magneto optical display is a factor to which a considerable amount of thought, creativity and effort has been devoted in the prior art with only a limited modicum of success.

It will be appreciated that the magneto-optical device 10 of this invention can be provided either as a transmissive device or a reflective device without departing from the scope of the invention. To make the magneto-optical device 10 reflective, a reflective layer (e.g. a metal) can be provided at the surface of the dielectric substrate 14 or on the epitaxial layer 16. Under such circumstances, the polarizer 34 can be disposed before the epitaxial layer 16 in the direction of movement of light toward the magneto-optical device 10.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination, a non-magnetizable substrate, a magnetizable material disposed on the substrate to define a plurality of pixels in magnetically isolated relationship to one another, the pixels being disposed in a relationship defining a plurality of successive rows and a plurality of successive columns, a first plurality of windings each disposed in a sinuous relationship around successive pixels in an individual one of the columns to apply a magnetizing force to such pixels in accordance with the current in such winding, and a second plurality of windings each disposed in a sinuous relationship around successive pixels in an individual one of the rows to apply a magnetizing force to such pixels in accordance with the current in such winding.

2. In a combination as set forth in claim 1, means for applying currents to an individual one of the windings in the first plurality and an individual one of the windings in the second plurality to obtain a magnetization of the pixel common to the individual ones of the windings in the first and second pluralities.

3. In a combination as set forth in claim 2, the substrate being made from a material which passes light and the pixels in the magnetizable material having properties of providing a first polarization with magnetizations of a first polarity and of providing a second polarization with magnetizations of a second polarity.

4. In a combination as set forth in claim 3, means for passing light through the pixels with the first polarization and through the substrate and for blocking the passage of light through the pixels with the second polarization.

5. In a combination as set forth in claim 4, the current-applying means being operative to produce currents in the individual ones of the windings in the first and second pluralities to obtain the production of magnetic fluxes of opposite polarities and of unequal magnitudes in the pixel common to the individual ones of such windings.

6. In combination, a member having a layer with magnetizable pixels disposed in a relationship to define a plurality of rows and a plurality of columns, each of the pixels being defined by a periphery facing in a plurality of different directions, a first plurality of windings each disposed to envelope three (3) of the facing directions of the pixels in an individual one of the columns in the plurality, and a second plurality of windings each disposed to envelope three (3) of the facing directions of the pixels in an individual one of the rows in the plurality, at least one of the three (3) facing directions of a pixel enveloped by an individual one of the winding in the first plurality being different from the three (3) facing directions of such pixel enveloped by an individual one of the windings in the second plurality.

7. In a combination as set forth in claim 6, means for applying a current to an individual one of the windings in the first plurality and a current to an individual one of the windings in the second plurality to produce magnetic fluxes in opposite directions in the pixel common to such individual one of such windings.

8. In a combination as set forth in claim 7, the intensity of the magnetic flux produced by the individual one of the windings in the first plurality being different from the intensity of the magnetic flux produced by the individual one of the windings in the second plurality.

9. In a combination as set forth in claim 8, the magnetizable pixels being separated in the layer from each other by non-magnetizable portions in the layer, the windings in the first plurality being electrically isolated from the windings in the second plurality and from the pixels, the windings in the first plurality being isolated electrically from one another and the windings in the second plurality being isolated electrically from one another and from the pixels.

10. In a combination as set forth in claim 7, the magnetizable pixels being separated in the layer from each other by non-magnetizable portions in the layer, the windings in the first plurality being electrically isolated from the windings in the second plurality and from the pixels.

11. In a combination as set forth in claim 6, the windings in the first plurality being isolated electrically from one another and from the pixels and the windings in the second plurality being isolated electrically from one another and from the windings in the first plurality and from the pixels.

12. In a combination as set forth in claim 6, the magnetizable pixels being disposed in a planar relationship in the layer, the windings in the first plurality being disposed in a planar relationship spaced and electrically isolated from the magnetizable pixels, the windings in the second plurality being disposed in a planar relationship spaced and electrically isolated from the magnetizable pixels and the windings in the first plurality.

13. In a combination as set forth in claim 11, the planar relationship of the windings in the second plurality being substantially parallel to the planar relationship of the windings in the first plurality and to the pixels.

14. In a combination as set forth in claim 12, means for producing currents in an individual one of the windings in the first plurality and an individual one of the windings in the second plurality to magnetize the pixel common to such windings in opposite polarities in accordance with the relative characteristics of such currents.

15. In a combination as set forth in claim 6, means for applying a current to an individual one of the windings in the first plurality and a current to an individual one of the windings in the second plurality to produce magnetic fluxes of an intensity in the pixel common to such individual ones of such windings to polarize such pixel.

16. In combination, a member having a layer with a plurality of pixels magnetically isolated from one another and disposed to define a plurality of columns and a plurality of rows, a first plurality of windings each magnetically coupled to the pixels in an individual one of the columns, a second plurality of windings each magnetically coupled to the pixels in an individual one of the rows, and means for producing currents through an individual one of the windings in the first plurality and an individual one of the windings in the second plurality to produce, as a result of such current flows, magnetic fluxes of opposite polarities in a pixel common to such windings and to produce in such common pixel a resultant magnetic flux having a polarity dependent upon the relative intensities of such current flows.

17. In a combination as set forth in claim 16, the individual one of the windings in the first plurality being partially disposed around such common pixel and the individual one of the windings in the second plurality being partially disposed around such common pixel.

18. In a combination as set forth in claim 17, at least a partial disposition by the individual one of the windings in the first plurality around the common pixel being at least partially different from at least a partial disposition of the individual one of the windings in the second plurality around the common pixel.

19. In a combination as set forth in claim 16, the windings in the first plurality having a planar relationship and the windings in the second plurality having a planar relationship.

20. In a combination as set forth in claim 19, the planar relationships of the windings in the first and second pluralities being substantially parallel to each other and the pixels being disposed in a planar relationship substantially parallel to the planar relationships of the windings in the first and second pluralities.

21. In a combination as set forth in claim 20, the windings in the second plurality being spaced and isolated electrically from the windings in the first plurality and the windings in the first plurality being spaced and electrically isolated from the pixels.

22. In combination, a dielectric substrate formed from a gadolinium gallium garnet, a transparent epitaxial planar layer of a gallium ferrite deposited on the dielectric substrate with more easily magnetizable properties at a plurality of spaced pixels on the layer than in the portion of the layers between the pixels, the pixels being disposed in the layer to define a plurality of rows and a plurality of columns, a first plurality of windings disposed in a planar relationship substantially parallel to the planar layer of gallium ferrite, each of the windings in the first plurality being disposed to produce magnetic fluxes in the pixels of an individual one of the columns in the plurality, the windings in the first plurality being disposed in spaced and electrically isolated relationship to one another and to the planar layer of gallium garnet, and a second plurality of windings disposed in a planar relationship substantially parallel to the planar layer of gallium ferrite, each of the windings in the second plurality being disposed to produce magnetic fluxes in the pixels of an individual one of the rows in the plurality, the windings in the second plurality being disposed in spaced and electrically isolated relationship to one another and to the planar layer of gallium garnet and to the windings in the first plurality.

23. In a combination as set forth in claim 22, means for applying currents to an individual one of the windings in the first plurality and to an individual one of the windings in the second plurality to produce magnetic fluxes in a pixel common to such individual ones of the windings.

24. In a combination as set forth in claim 23, the currents in the individual ones of the windings in the first and second pluralities being in opposite directions, one of the windings common to each individual pixel providing a current with a greater magnitude than the other one of the windings common to such individual pixel to produce a magnetic flux in the pixel common to the individual ones of the windings in accordance with the polarity of the current of greater magnitude.

25. In a combination as set forth in claim 22, each of the windings in the first plurality being disposed in a sinuous path relative to each of the pixels in an individual one of the columns and being magnetically coupled to each of such pixels in a greater periphery of such pixel than a straight line and each of the windings in the second plurality being disposed in a sinuous path relative to the pixels in an individual one of the rows and being magnetically coupled to each of such pixels in a greater periphery of such pixel than a straight line.

26. In a combination as set forth in claim 22, each of the windings in the first plurality extending in three (3) different directions, two (2) of them opposite to each other, relative to each of the pixels in an individual one of the columns and being magnetically coupled to each such pixel in the three (3) directions and each of the windings in the second plurality extending in three (3) different directions, two (2) of them opposite to each other, relative to the pixels in an individual one of the rows and being magnetically coupled to each such pixel in the three (3) directions.

27. In a combination as set forth in claim 26, at least one (1) of the three (3) directions for the magnetic coupling between each pixel and the individual one (1) of the windings in the first plurality being different from the three (3) directions for the magnetic coupling between such pixel and the individual one (1) of the windings in the second plurality.

28. A method of forming a magnetizable array, including the following steps:

providing a dielectric substrate with properties of passing light, disposing a layer of a material on the substrate with properties of being magnetizable, disposing a mask on the layer in a pattern to define a plurality of pixels arranged in a number of rows and a number of columns, each of the pixels being covered by the mask and the areas between the pixels not being covered by the mask, annealing the layer of the material with the mask on the magnetizable layer to enhance the magnetizable characteristics of the pixels relative to the areas between the pixels, and removing the mask from the layer of the material.

29. A method as set forth in claim 28 wherein the mask is made from a material having properties of becoming oxidized during the annealing to reduce oxygen in the substrate and the layer is made from a magnetizable material having properties of becoming ionized as a result of the reduction of oxygen in the substrate to increase the magnetizable properties of the layer in the area of the pixels.

30. In a method as set forth in claim 29, the mask being made from silicon and being oxidized during the annealing by the material under the mask to enhance the magnetizable properties of the layer in the areas defining the pixels.

31. In a method as set forth in claim 28, the steps of:

providing a first insulating layer on the layer with the magnetizable pixels, providing a first plurality of windings on the first insulating layer, each of the windings in the first plurality being disposed for coupling magnetically to an individual one of the rows in the plurality, providing a second insulating layer on the windings in the first plurality, and providing a second plurality of windings on the second insulating layer, each of the windings in the second plurality being disposed for coupling magnetically to an individual one of the columns in the plurality.

32. In a method as set forth in claim 28, the step of:

disposing first and second pluralities of windings on the layer with the magnetizable pixels in an insulated relationship to one another, each of the windings in the first plurality being disposed to magnetize the pixels in an individual one of the columns, each of the windings in the second plurality being disposed to magnetize the pixels in an individual one of the rows.

33. In a method as set forth in claim 32, each of the pixels having a periphery facing in a plurality of directions, each of the windings in the first plurality being disposed in magnetically coupled relationship to each of the pixels in an individual one of the columns in more than one (1) of the facing directions of such pixel, each of the windings in the second plurality being disposed in magnetically coupled relationship to each of the pixels in an individual one of the rows in more than one (1) of the facing directions of such pixel.

34. In a method as set forth in claim 33 wherein at least one of the facing directions for the windings in the first plurality is different from the facing directions for the windings in the second plurality.

35. A method of forming a magnetizable array, including the following steps:

providing a substrate from a material having non-magnetizable properties of passing light, depositing on the substrate a layer of a material having properties of becoming magnetizable, operating on the layer to form on the layer pixels at spaced positions with magnetizable properties, the pixels being disposed on the layer to define rows and columns, forming a first plurality of windings on the pixels in a first planar relationship, each of the windings in the first plurality being disposed in spaced and isolated relationship to one another and to the pixels to produce magnetic flux through the pixels in an individual one of the columns in accordance with the flow of current through such winding, forming a second plurality of windings on the pixels in a second planar relationship, each of the windings in the second plurality being disposed in spaced and isolated relationship to one another and to the pixels and to the windings in the first plurality to produce magnetic flux through the pixels in an individual one of the rows in accordance with the flow of current through such winding.

36. A method as set forth in claim 35, including the step of:

producing a flow of current through an individual one of the windings in the first plurality and an individual one of the windings in the second plurality to form magnetic fluxes in a pixel common to such windings of a magnitude to provide a magnetic polarization in such pixel dependent upon the magnitudes and polarities of such currents.

37. A method as set forth in claim 36, including the step of:

each of the windings in the first plurality extending in at least two different directions relative to each of the pixels in the individual one of the columns and each of the windings in the second plurality extending in at least two different directions relative to each of the pixels in the individual one of the rows.

38. A method as set forth in claim 36, including the step of:

each of the windings in the first plurality extending in at least three (3) different directions, two (2) being opposite to each other, relative to each of the pixels in an individual one of the columns and each of the windings in the second plurality extending in three (3) different directions, two (2) being opposite to each other, relative to the pixels in an individual one of the rows.

39. A method as set forth in claim 38, wherein at least one of the three (3) different directions for each of the windings in the first plurality is different from the three (3) different directions for the windings of the second plurality.

40. A method as set forth in claim 35 wherein the magnetic fluxes are produced in opposite directions in the pixel common to such windings and wherein a magnetic polarization is provided in such pixel accordance with any difference in the magnitudes of such currents.

* * * * *